(No Model.)

J. A. MÖLLINGER & K. KURDA.
ALTERNATING CURRENT MOTOR METER.

No. 606,630. Patented June 28, 1898.

Witnesses.
M. F. Keating
H. J. Bohlmann

Inventor
Julius A. Möllinger
Karl Kurda
By atty Charles J. Kintner

UNITED STATES PATENT OFFICE.

JULIUS ADOLF MÖLLINGER AND KARL KURDA, OF NUREMBERG, GERMANY.

ALTERNATING-CURRENT MOTOR-METER.

SPECIFICATION forming part of Letters Patent No. 606,630, dated June 28, 1898.

Application filed December 27, 1897. Serial No. 663,457. (No model.)

*To all whom it may concern:*

Be it known that we, JULIUS ADOLF MÖLLINGER and KARL KURDA, electrical engineers, subjects of the German Emperor, residing at Nuremberg, in the Kingdom of Bavaria, German Empire, have invented a new and useful Improvement in Alternating-Current Motor-Meters, of which the following is a specification.

Our present invention relates to improvements in those alternating-current motor-meters having two shunt inductive resistances placed in series, in which the variable displacement of phase generated in the current-consumers is equalized by means of a primary and a secondary shunt-field, the latter being induced by the primary shunt-field; and the objects of our improvements are to provide peculiar means for the shunt inductive resistances, so as to simplify the meter construction and guarantee an accurate metering of the energy consumed in a given current.

In order to enable others skilled in the art to construct and use the same, reference is had to the accompanying drawings, in which—

Figure 1:
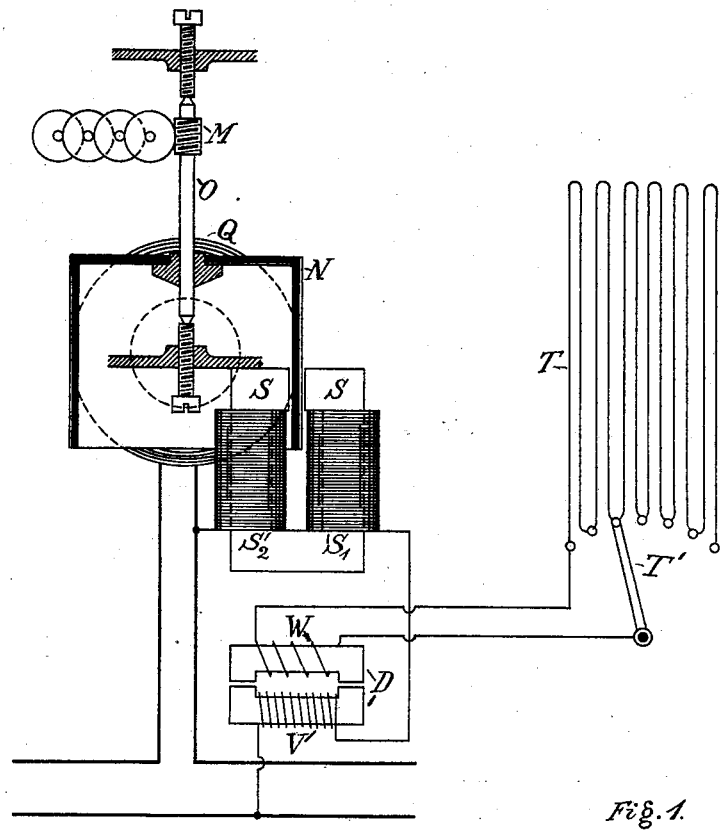
Figure 2:
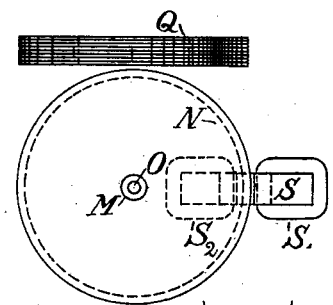
Figure 3:

Figure 1 is a sectional view of a meter constructed in accordance with our invention. Fig. 2 is a top view of the same. Fig. 3 is a detail view of a portion of the choking device, illustrating its laminated structure and one of the coils thereof.

Referring to the drawings, N designates a metallic armature-cylinder rotatably mounted by means of a shaft O, said shaft having suitable bearings in the frame and provided with a worm M or other means, from which motion is conveyed to a counter, register, or recording device. (Not shown, but of any suitable or well-known construction.)

Q is a coreless solenoid placed in the circuit to be measured. The shunt magnetic field is produced by means of the coils S' and S² on the core S, said coils being placed in series with the coil V of a choking device D, consisting of two separate iron cores, these cores having, respectively, the coil V and another secondary coil W, placed in series with a variable resistance T, preferably bifilar and provided with a switch-arm T' for varying said resistance as desired.

The cores of the choking device D are constructed of thin, soft, well-isolated sheet-iron, whereby the electric losses are very small. The core S, carrying the coils S' and S², is preferably made out of thick sheet-iron, cast-iron plate, or steel-plate or of solid iron, whereby the electric losses are very great. Experience has shown that by this arrangement the errors of the meter caused by the variable displacement of phase in the current-consumers or translating devices are avoided, particularly if the free poles of the iron core S be placed close together, so as to hardly permit the armature N to rotate between them.

To obtain the best results, the magnetic and electric properties of the choking device D and of the motor shunt-field S S' S² must be so chosen as to give the latter too great a phase displacement, which can be easily lessened and regulated to a suitable amount by means of the coil W, variable resistance T, and switch-arm T'.

Having thus described our invention, what we claim, and desire to secure by Letters Patent of the United States, is—

1. An alternating-current motor-meter having a shunt-field consisting of two inductive-resistance coils placed in series with the coil of a choking device, the core or cores of the shunt-field magnet being constructed of thick sheet-iron, cast-iron plate, steel-plate or solid iron, and the core of the choking device of thin subdivided well-isolated sheet-iron, substantially as described.

2. An alternating-current motor-meter having a shunt-field consisting of two inductive-resistance coils placed in series with the coil of a choking device, the core or cores of said shunt-field magnet being constructed of thick sheet-iron, cast-iron plate, steel-plate or solid iron, and the core of the choking device consisting of thin subdivided and well-isolated sheet-iron, in combination with a secondary short-circuited coil included in circuit with a variable resistance and having a magnetic core located adjacent to the core of the choking device, substantially as described.

3. An alternating-current motor-meter consisting of a coreless solenoid located in the circuit to be measured, a rotary metallic armature operatively connected with a train of gearing, a shunt-field magnet consisting of two coils, in combination with a choking device having its coil located in series with said coils, together with a secondary short-circuited coil included in circuit with a variable resistance, the cores of the secondary coil and the choking device being located in close proximity to each other and constructed of thin subdivided and well-isolated sheet-iron, while the cores of the shunt-field magnet are constructed of thick sheet-iron, cast-iron plate, steel-plate or solid iron, substantially as described.

In testimony whereof we have hereunto subscribed our names this 9th day of December, 1897.

JULIUS ADOLF MÖLLINGER.
  KARL KURDA.

Witnesses:
  ALOIS GOBANZ,
  OSCAR BOCK.